(12) United States Patent
Benzing, II

(10) Patent No.: US 6,416,013 B1
(45) Date of Patent: Jul. 9, 2002

(54) SELF-ALIGNING SPOOL AND METHOD FOR STORING STRIP COMPONENTS

(75) Inventor: James Alfred Benzing, II, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 48 days.

(21) Appl. No.: 09/663,460

(22) Filed: Sep. 15, 2000

(51) Int. Cl.$^7$ ............................................. B65H 18/08
(52) U.S. Cl. ...................................... 242/536; 242/602
(58) Field of Search ................................. 242/536, 602, 242/530.2, 530.3, 160.1, 160.4

(56) References Cited

U.S. PATENT DOCUMENTS

| | | |
|---|---|---|
| 1,611,400 A | 12/1926 | Andrews |
| 2,336,754 A | 12/1943 | Schelhammer et al. |
| 4,447,014 A | 5/1984 | Azuma et al. ................. 242/55 |
| 5,004,635 A | 4/1991 | Griebling ...................... 428/33 |
| 5,412,132 A | 5/1995 | Lucarelli et al. ............. 556/414 |

FOREIGN PATENT DOCUMENTS

| | | | |
|---|---|---|---|
| EP | 0409391 | * 1/1991 | ................. 242/536 |
| EP | 0 621 124 A1 | 4/1994 | |
| JP | 111261-1986 | 5/1986 | |

OTHER PUBLICATIONS

U.S. Application No. 09/475,339, filed 12/30/99, our reference No. DN1999271USA.

* cited by examiner

Primary Examiner—John Q. Nguyen
(74) Attorney, Agent, or Firm—David L. King

(57) ABSTRACT

A method and apparatus (100) for storing strip material (10). More specifically, a method and apparatus for positioning a continuous strip of material (10) onto a spool (4). The strip of material is supported on a liner spaced by a spacer not physically attached to the liner and thereby being circumferentially stretchable relative to the liner.

8 Claims, 4 Drawing Sheets

SELF-ALIGNING SPOOL AND METHOD FOR STORING STRIP COMPONENTS

FIELD OF THE INVENTION

The present invention is directed toward a method and apparatus for storing strip material. More specifically, the present invention is directed towards a method and apparatus for positioning a continuous strip of material onto a spool.

BACKGROUND OF THE INVENTION

The present discussion is directed specifically towards the manufacture of strip material for building tires; however, the background art and the disclosed invention may also be applicable to other types of manufacturing wherein it is necessary to store strip material.

When forming a strip component, it may be desired to store the component in a manner that prevents the destruction or alteration of any preformed cross-sectional configuration. This is frequently accomplished by storing the component in a spiral spool storage device. The component is placed on a liner that is spirally wound inside the spool. Spacing between adjacent rows of spirally wound liner prevents the adjacent layers of wound material from contacting, thus preserving the preformed cross-sectional configuration of the strip component.

U.S. Pat. No. 5,412,132, JP 61-111261, and EP 621,124 illustrate such storage devices. U.S. Pat. No. 5,412,132 discloses a spool with stepped flanges wherein a liner of increasing width rests on the stepped flanges to support the component within the spool storage device. JP 61-111261 discloses a spool formed with protrusions for the edges of a liner to rest upon. EP 621,124 discloses a spiral spool storage device wherein the edges of the liner rest in continuous spiral grooves formed on the inner face of the spool flanges.

Because the space provided for the edges of the liner are of a relatively small dimension, the liner must be precisely fed to the storage spool. JP 61-111261 discloses first feeding the liner through a fixed metal plate. The plate has an arcuate shape with flanged sides causing the plate to have a width less than the width of the liner. The liner is fed through the plate, inside the flanges, reducing the effective width of the liner. After the liner passes through the plate, the liner is feed onto the spool prior. The liner returns to its original width after once it is placed onto the spool, known in the art as the liner "popping" into place.

EP 621,124 also teaches reducing the effective width of the liner prior to feeding it into position on the spiral spool. Three different methods of reducing the liner width are disclosed. Two methods employ the use of curved bars through which the liner passes. The curved bars are in a fixed angular relationship with the rod upon which the bars are attached. The third method disclosed employs two pairs of deflecting bars. The first pair initially deflects the edges of the liner and the second pair slides relative to the spiral spool to ensure proper positioning of the liner onto the spool.

While the above methods accomplish the goal of delivering the liner to the spiral spool, these methods require precise placement of the liner to prevent the liner from popping out of place, and to prevent folding and creasing. When such problems do occur with the liner, the continuous manufacturing of the component must be stopped to resolve the problem. The present invention is directed to a method of delivering the liner to the spiral spool in a manner and by an apparatus which overcomes these limitations and issues of the known delivery systems.

SUMMARY OF THE INVENTION

A self-aligning spool has an axis of rotation and is adapted for storing elastomeric components of a profiled cross-sectional shape. The spool has a circumferentially compliant liner for spirally wrapping about the axis. The liner has a pair of lateral edges. Separate from the liner is a pair of traction spacers. One traction spacer is located adjacent each lateral edge of the liner. Each traction spacer has a width and a thickness. The thickness of the traction spacer establishes the radial space between each spiral layer of the circumferentially compliant liner. Each traction spacer is a separate component of the spool and is provided in strips of material preferably radially compressible and circumferentially stretchable. Most preferably the traction spacers are elastomeric.

In the preferred embodiment the spool has at least one end having a perpendicular surface relative to the axis of rotation. The perpendicular surface of the at least one end provides a means to restrain lateral movement of the wound spool, its liner and associated strip applied to the liner.

A method for storing continuous lengths of formed strips of elastomeric components having a profile cross-sectional shape onto a storage spool is described.

The steps include placing the formed strip component on a liner having a pair of lateral ends and a pair of longitudinal ends, placing a traction spacer adjacent each lateral end of the liner, the traction spacers being strips having height or thickness slightly greater than the formed strips. The method further includes fixing a longitudinal end of the liner adjacent an axis of rotation of the spool, rotating the axis thereby winding the liner, the traction spacer and the strip into a spiral wherein the liner and the traction strip are radially supported by the traction spacers.

In the preferred method the additional step of restraining the lateral ends of the spool from lateral movement is provided for. The method further comprises the step of equalizing the diametrical dimension of each lateral end of the liner as the liner is being rotated to form the spiral. The step of equalizing the diametrical dimension of each lateral end includes the step of stretching the traction spacer of the lateral end having the larger diameter, thereby reducing the spacer thickness creating a reduced rate of diameter increase at one lateral end relative to the opposite end. The step of stretching the traction spacer on one lateral end more than the opposite lateral end is an automatic function whereby the torque applied to the traction spacers is greater at the larger diameter end thereby causing the strip to stretch and reduce its cross-sectional height or thickness automatically adjusting the diameter such that as the strip and spiral liner is wound the diameters are equalized and the torque generated approximates equal at each lateral end. Furthermore, the step of rotating the axis thereby winding the liner, traction spacer and formed strip component into a spiral includes the step of forming a substantially airtight pocket in which the formed strip component is positioned.

DETAILED DESCRIPTION OF THE INVENTION

Figure 1:
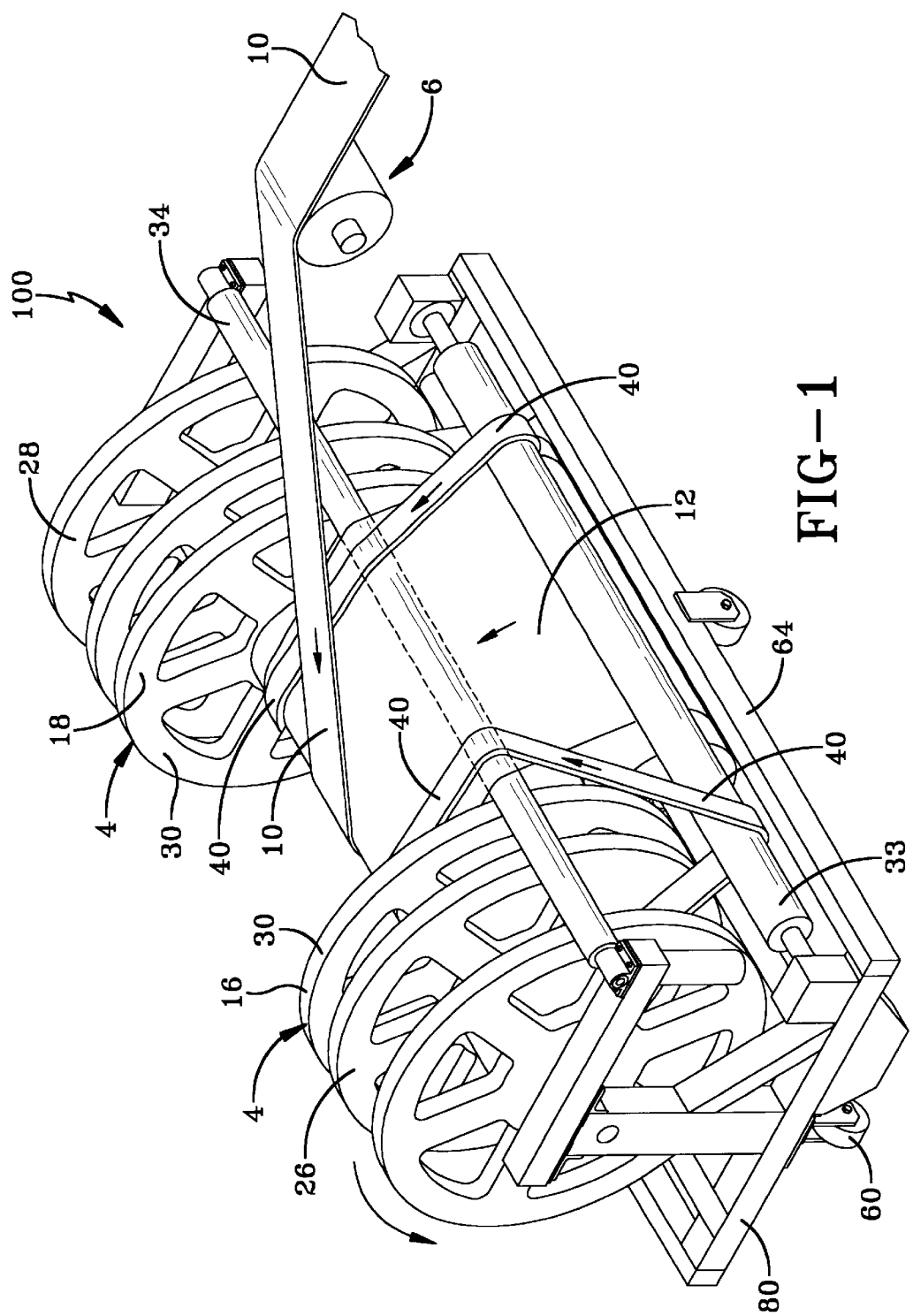
FIG. 1 illustrates an apparatus for winding a formed strip component in a perspective view.
Figure 2:
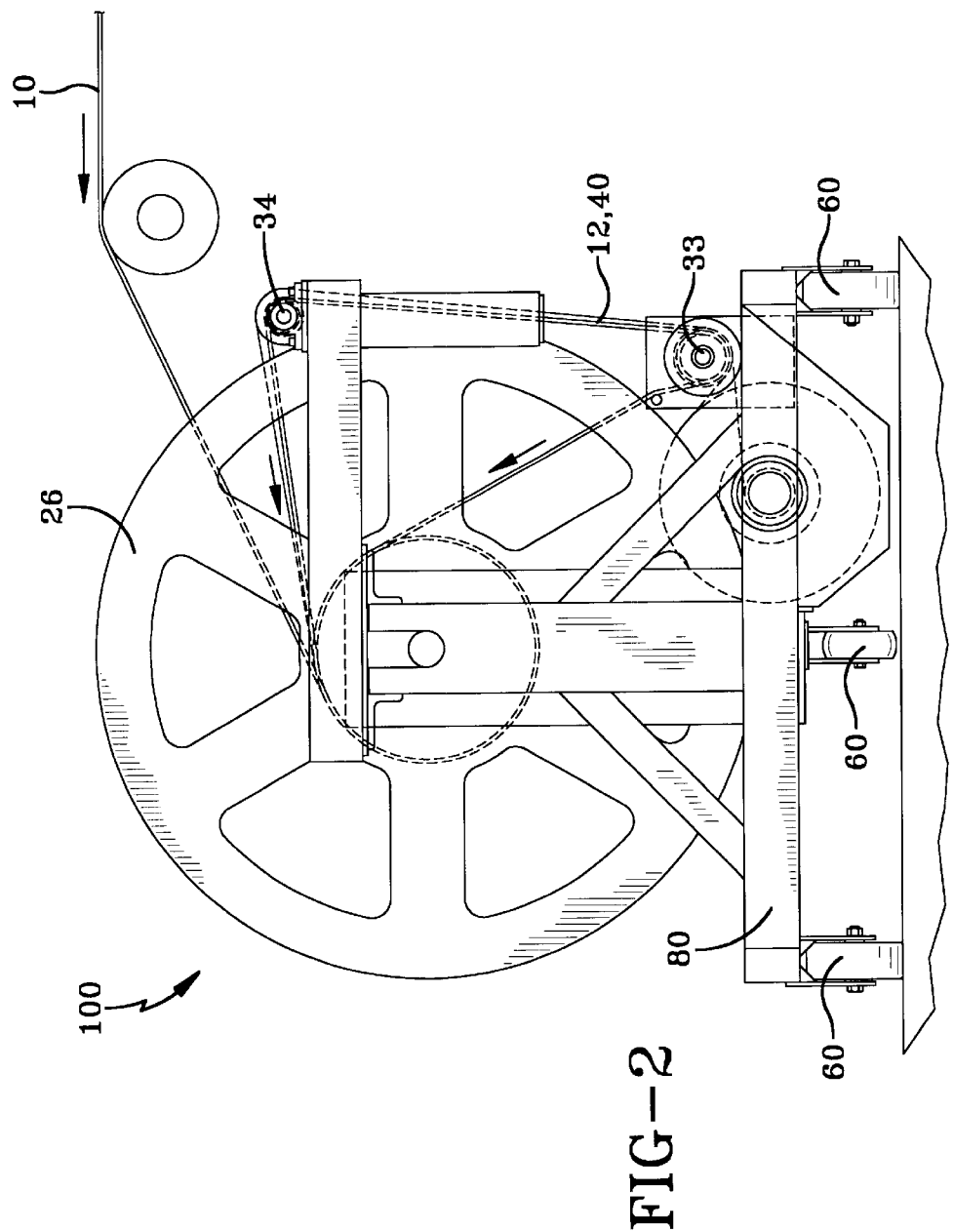
FIG. 2 is a plan view of the spool of FIG. 1.

With reference to FIG. 1 an apparatus 100 for incorporating the present invention, for winding and storing a formed strip component 10 is illustrated. The apparatus 100 has a spool 4 onto which the strip component 10 is to be wound. The strip component 10 is preferably taken from a let-off means after it has been freshly formed into its desired cross-sectional profile. The spool 4 upon which the strip 10 is to be wound is mounted on an axle 14 coincident, but independent with the axis of the spool 4 and upon which the spool 4 rotates. As the spool 4 rotates, a circumferentially compliant liner 12 is fed from one side of the spool 4 while the strip component 10 is unlaid upon the liner 12 of the spool 4. As this is occurring a pair of traction spacers 40 are applied adjacent each lateral edge 22,24 of the liner 12 as illustrated. These traction spacers 40 have a width (W) and a thickness (T) and as they are fed into the spool 4, they provide a spacing 30 in which the formed elastomeric strip component 10 can occupy between spiral layers of the liner 12.

In the preferred embodiment of the invention the spool 4 includes a pair of spool end flanges 16,18. These spool end flanges 16,18 are attached to the axis of the spool 4 and provide a perpendicular surface relative to the axis of rotation of the spool 4. These flanges 16,18 restrain lateral movement of the spiral as it is being wound, preferably these flanges 16,18 have a smooth surface in which the liner 12 and associated traction spacers 40 and the formed strip component 10 can easily slip therebetween.

The liner 12 preferably has a sufficient lateral width to extend between the spool flanges 16,18 to permit the liner lateral edges 22,24 to rest in close proximity to the flanges 16,18. This insures that the liner 12 does not telescope as it is being wound.

The liner 12 must be formed of strong enough material so that the weight of the strip component 10, when wound up into the spool 4, does not cause the liner 12 to deflect and crush or contact the component 10 stored upon radially inner windings of the stored component 10 and liner 12. The liner 12 when bent around the spool has a curvature which yields additional load carrying support. Preferred materials for the liner 12 include rigid polyethylene, terephthalate, polypropylene, and other similar materials.

As illustrated the strip component 10 can be unvulcanized elements of a tire, such as sidewalls, tread, apex, or any other strip material that could be susceptible of crushing in conventional storage mechanisms.

Figure 5:
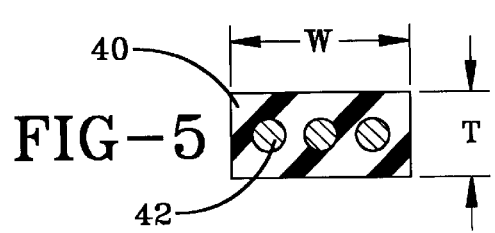
FIG. 5 is a cross-sectional view of a traction spacer 40.

As further illustrated, as the liner 12 is fed into the spool 4 adjacent each lateral edge 22,24 of the liner 12 a traction spacer 40 is inserted. As the liner 12 winds about the spools axis, these traction spacers 40 provide a pocket or space 30 for which the formed strip component 10 is to be positioned. Preferably each traction spacer 40 has a cross-sectional area as shown in FIG. 5 defined by a thickness (T) and a width (W). As illustrated, in FIG. 3, the traction spacers 40 are provided as strips of material that is radially compressible and circumferentially stretchable. As illustrated in the preferred embodiment the traction spacers 40 are elastomeric. It is believed important that the deformation of the traction spacers 40 be limited such that the formed strip component 10 is not contacted by the liner 12 in the adjacent spiral layers as the spiral is wound increasing in diameter.

Figure 3:
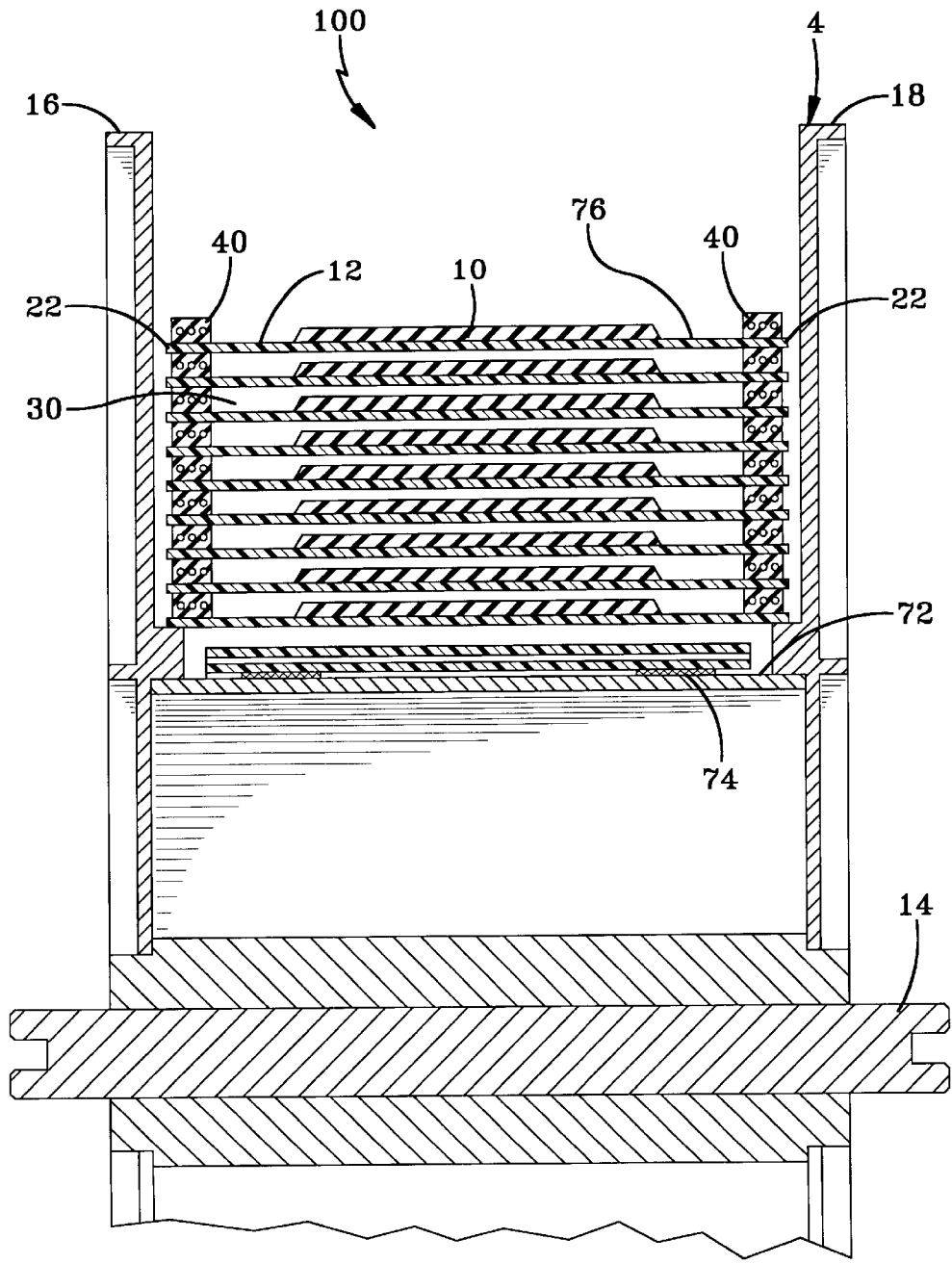
FIG. 3 illustrates the cross-sectional view of the spiral spool with the formed strip component, liner and traction spacers are wound thereon.

As further shown in FIG. 3, the entire weight of the spool is supported at the lateral edges 22,24 by these traction spacers 40 being stacked in a vertical fashion as the spiral is wound. The spool 4 may include a round windup drum or cylinder 72 to keep the diameter sufficiently large initially to enable the liner to circumferentially bend without distortion or crimping. At the drum a Velcro™ or other type adhesion 74 of the liner 12 to the drum 72 can be used as illustrated. In the preferred spool 4 the user bends the liner 12 into a slot in the drum 72 to secure the liner 12.

Figure 4:
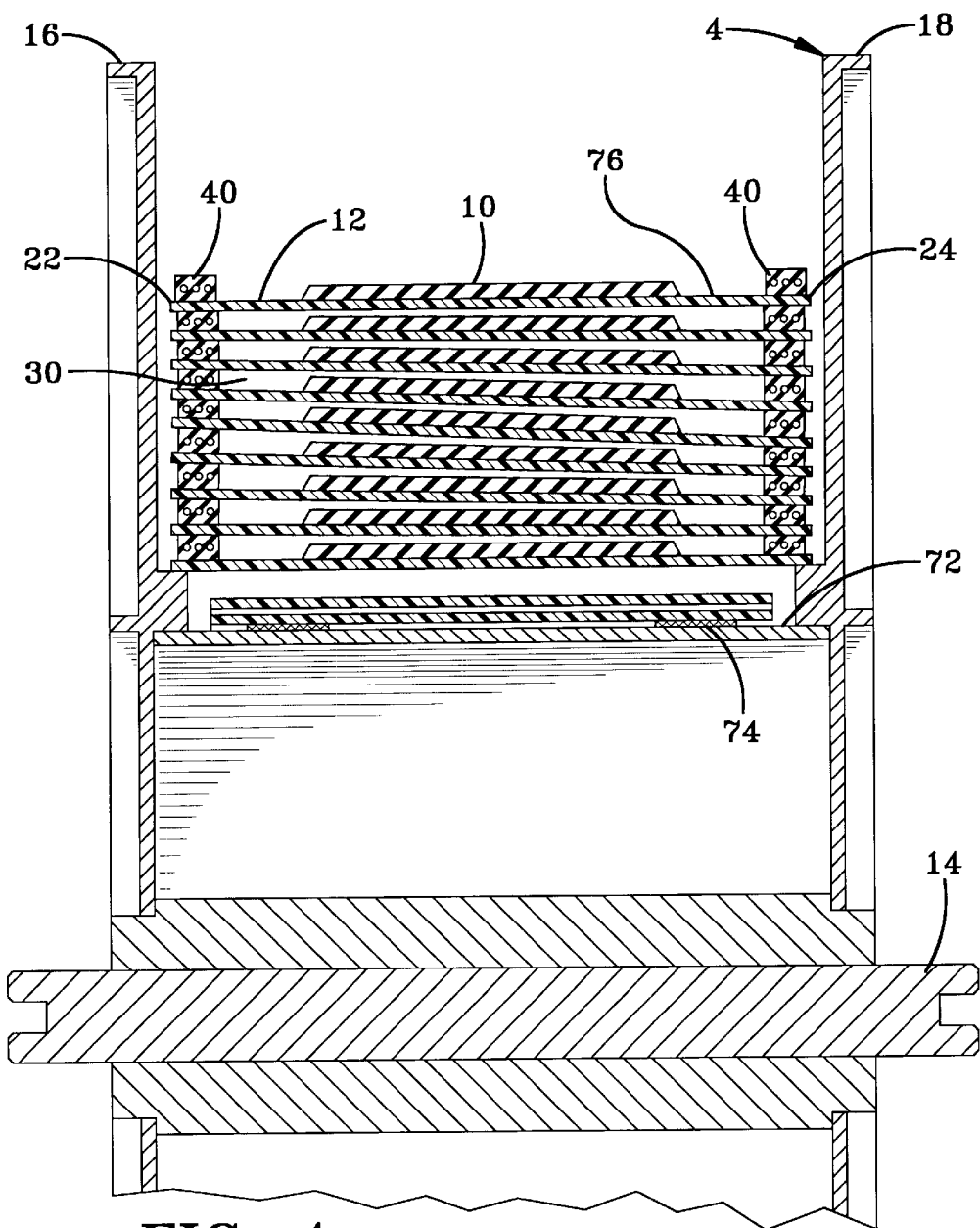
FIG. 4 is the view of FIG. 3 showing an exaggerated tolerance misalignment of the spiral thereby causing an increase torque at one end of the spiral spool.

With reference to FIG. 4 a view similar to FIG. 3 is shown wherein an exaggerated tolerance misalignment of the spiral is created thereby causing an increased torque at the end of the spiral having a larger diameter. When this condition exists the traction spacers 40 on the larger side of the spool are stretched thereby causing a reduction in thickness (T) of the traction spacer 40. As the traction spacer 40 thickness (T) is reduced and the spiral continues to wind, the variation in diameter from one side to the other automatically is compensated for until the diameters are approximately in equal dimension. This self-compensating diameter adjustment capability is believed possible because the traction spacers 40 are separate from the liner and are not physically attached to the liner which would restrain the ability to stretch.

Traditionally, in tire manufacturing the ability to wind components onto a spool is limited to an overall diameter of 42 inches. By use of the present invention it is possible to have spiral spools at approximately 72 inches in diameter, or almost 2 meters. For example, 60 meters of strip material 10 can be wound on a conventional spool whereas with the spool 4 of the present invention approximately 150 meters of material can be wound. This translates into 40 tires for the conventional type spool and a 100 tires capacity on the spool 4 made according to the present invention.

A second advantage of having all the supported load transferred through the traction strips 40 is that liner 12 damage can be reduced and the thickness of the liner 12 can be reduced because the strength and load transfer occurs almost entirely at the traction spacer area. The ends 22,24 are fully supported while the central portion of the liner 12 only has to support each layer of material 10. This means the liners 12 can be produced substantially thinner than in the past. Another advantage of the present invention is that the thickness of the helix can be changed or varied by changing the traction strip 40 thickness (T). This is beneficial when thinner materials such as a sidewall is produced when compared to a tread. By reducing the thickness of the traction spacers, even more material can be stored on the spool 4.

When the spools 4 are emptied, the liner 12 can be wound tightly upon its own axis and the traction space 40 also can be wound tightly on their axis. This greatly reduces the storage of these spools 4.

By making the traction spacers 40 of elastomeric material and positioning at the lateral edges 22,24 of the spiral means that a sealed pocket 30 with the air mixture contained is possible. This helps insure that the product is fresh when delivered. To further facilitate this as the spool 4 is wound, it is believed preferable to tape or seal any exposed longitudinal end. In the manufacture of tire components 10 this feature is quite beneficial because it allows the product that was recently extruded and profiled to cool at a slower rate which enables the strip component 10 to exhibit less thermal shrink variations. With reference to FIG. 3 again the traction spacers 40 as illustrated in the preferred embodiment had a cross-sectional width of 50 millimeters and a cross-sectional height of 13.5 millimeters. Spaced centrally within each traction spacer 40 was a plurality of holes 42 extruded into the strip. These holes were approximately $3/16^{th}$ of an inch (4.8 mm) and extended longitudinally throughout each traction spacer 40. These holes 42 add to the deformation capability of the traction strip 40 and help reduce the weight of this component.

In the prior art spools it was noticed that as the spool increased in diameter the profile of the component was smashed. At the top of the stored strip a torque was transmitted to the preformed component being carried on the liner such that wrinkles occurred in the lateral edges. These wrinkles created non-uniformity's in the tire and particular caused thickness variations. With regard to the present invention all of these negative aspects have been eliminated.

While it is appreciated that pocket liners have been used in the prior art, the present invention provides a novel way of creating a self-adjusting spiral wound spool wherein the vertical height is established by separate components or spacers referred herein as the traction spacers 40 that are stretchable thereby causing a reduction in thickness to enable diametrical differences that would often occur in multiple windings of spirals to be automatically compensated for and eliminated. It was confirmed in test that the self-aligning feature, when traction spacers 40 having an elastomer shore hardness of A of about 80, would initiate when 1.0 millimeter or less in diameter variation occurred. What this means is that the self-aligning feature initiates very quickly at the onset of a misalignment in diameters, thereby insuring that the equality of the spiral is maintained throughout the various layers of the spiral. This is important because if the misalignment was substantially greater than this an angular variation in the spool could occur, and, therefore, this spool within various layers could have a quite severe angular orientation. Surprisingly this does not occur with the use of the present invention.

With reference to FIG. 1a, the preferred embodiment of the invention is illustrated. The apparatus 100 has the spool 4 mounted onto a frame 80. The frame 80 has wheels 60 enabling the entire apparatus 100 to be moved about freely. The spool 4 has a diameter of about 72 inches and the apparatus 100 when fully loaded with a wound formed strip component 10 weighs about 7500 lbs. Naturally, motorized tow motors are used to move these large fully loaded spools 4.

As illustrated in the preferred apparatus 100, the traction spacers 40 are mounted in self-contained spools 26,28 at each end of the spool adjacent the flanges 16, 18, and are positioned onto the liner 12, and feed over a pair of rollers 33,34, prior to being wound onto the spool 4. As shown, as the spool 4 rotates, a formed strip of component 10 is laid onto the liner 12 between the traction spacers. Alternatively, the strip 10 can be fed onto the liner 12 and wound under the drum 72 of the spool 4. Once the spool 4 is full, the entire apparatus 100 can be towed to a storage location or to the tire building station.

Ingeniously by reversing the direction of rotation, the liner 12 and the traction spacers 40 can be rewound to the unloaded position. When all the formed strip component 10 is removed, the apparatus 100 can be taken back to a loading station.

The apparatus 100 creates a totally self-contained device for loading and unloading a component in strip form. The spool 4 has self-aligning traction spacers 4 that compensate for and actually prevent misalignment of the helically wound spool.

These features, when employed as taught herein, are the most efficient way to store strip materials without damaging the profile of the formed strip component 10.

What is claimed is:

1. A self-aligning spool having an axis of rotation and being adapted for storing elastomeric formed strip components of a profiled cross-sectional shape, the spool comprising:

a circumferentially compliant liner for spirally wrapping about the axis, the liner having a pair of lateral edges; and a pair of traction spacers, one traction spacer being located adjacent each lateral edge of the liner, each traction spacer having a width and a thickness, the thickness of the traction spacer establishes the radial space between each spiral layer of the circumferentially compliant liner, each traction spacer being a separate component of the spool, not physically attached to the liner and thereby being circumferentially stretchable relative to the liner.

2. The self-aligning spool of claim 1 wherein the traction spacers are strips of material.

3. The self-aligning spool of claim 1 wherein the traction spacers are radially compressible.

4. The self-aligning spool of claim 1 further comprising at least one end having a perpendicular surface relative to the axis of rotation, the perpendicular surface of the at least one end provides a means to restrain lateral movement of the wound spool.

5. The self-aligning spool of claim 1 wherein the traction spacers are elastomeric.

6. The method of storing continuous lengths of formed strips of elastomeric components having a profiled cross-sectional shape onto a storage spool comprising the steps of:

placing the formed strip component onto a liner having a pair of lateral ends;

placing a traction spacer adjacent each lateral end of the liner, but not physically attached to the liner, the traction spacers being strips having a height thickness (T) slightly greater than the formed strips;

fixing a longitudinal end of the liner adjacent an axis of rotation of the spool;

rotating the axis of rotation of the spool winding the liner, traction spacers and the formed strip component into a spiral wherein the liner and the formed strip component are radially supported by the traction spacers;

restraining the lateral ends of the spool from lateral movement; and equalizing the diametrical dimension of each lateral end of the liner as the liner is being rotated to form the spiral, wherein the step of equalizing the diametrical dimension of each lateral end includes the step of stretching the traction spacer of the lateral end having the larger diameter, thereby reducing the spacer thickness creating a reduced rate of diameter increase at one lateral end relative to the opposite end.

7. The method of storing of claim 6 wherein the step of stretching the traction spacer on one lateral end more than the opposite lateral end is an automatic function whereby the torque applied to the traction spacer is greater at the larger diameter end and when the diameters are equal the torque generated is equal at each end.

8. The method of storing of claim 6 wherein the step of rotating the axis, winding the liner, traction spacers and strip into a spiral includes the steps of forming a substantially airtight pocket.

* * * * *